United States Patent [19]
Bertagna et al.

[11] Patent Number: 5,421,530
[45] Date of Patent: Jun. 6, 1995

[54] CORD RETRACTOR MECHANISM

[75] Inventors: Richard A. Bertagna, Monrovia; Dwight G. Westover, Sierra Madre, both of Calif.

[73] Assignee: Hughes-Avicom International, Inc., Glendora, Calif.

[21] Appl. No.: 156,161

[22] Filed: Nov. 23, 1993

[51] Int. Cl.⁶ ............................................. B65H 75/18
[52] U.S. Cl. ................................................. 242/47.5
[58] Field of Search ......................................... 242/47.5

[56] References Cited

U.S. PATENT DOCUMENTS 3,160,360 12/1964 Spieldiener et al. ............... 242/47.5
4,174,816 11/1979 Olson ................................. 242/47.5

FOREIGN PATENT DOCUMENTS 242742   2/1965  Austria ............................. 242/47.5
1408343  7/1965  France .............................. 242/47.5
1774629  9/1978  Germany ........................... 242/47.5
2720159 10/1978  Germany ........................... 242/47.5

Primary Examiner—John P. Darling
Attorney, Agent, or Firm—Elizabeth E. Leitereg; Terje Gudmestad; W. K. Denson-Low

[57] ABSTRACT

A mechanism for releasably retracting and storing a length of electrical cord (96,98,100,102,104) is formed of first and second pairs of cord pulleys (60,62,82,84) mounted at opposite ends of an elongated retractor frame (18). An intermediate section of a cord is stored in the frame and has one end (92) of the stored section fixed to the frame, with the other end (106) extending from the frame. The stored cord section is wound around the two pairs of cord pulleys (60,62,82,84), and one pair of pulleys (60,62) is slidably mounted for motion toward the other pair of pulleys (82,84) with a detachable latch (126) to lock the movable pulleys in position adjacent the fixed pulleys in a cord extended position. Springs (70,72) entrained around force direction changing spring pulleys (66,68) constantly urge the slidable pulleys (60,62) to an initial position wherein the cord is retracted. Pulling on one end (106) of the cord extends a length of the stored cord section from the frame and latches the mechanism in cord extended position. A second pull on the cord releases the latch to enable the springs to retract the cord into the mechanism.

7 Claims, 2 Drawing Sheets

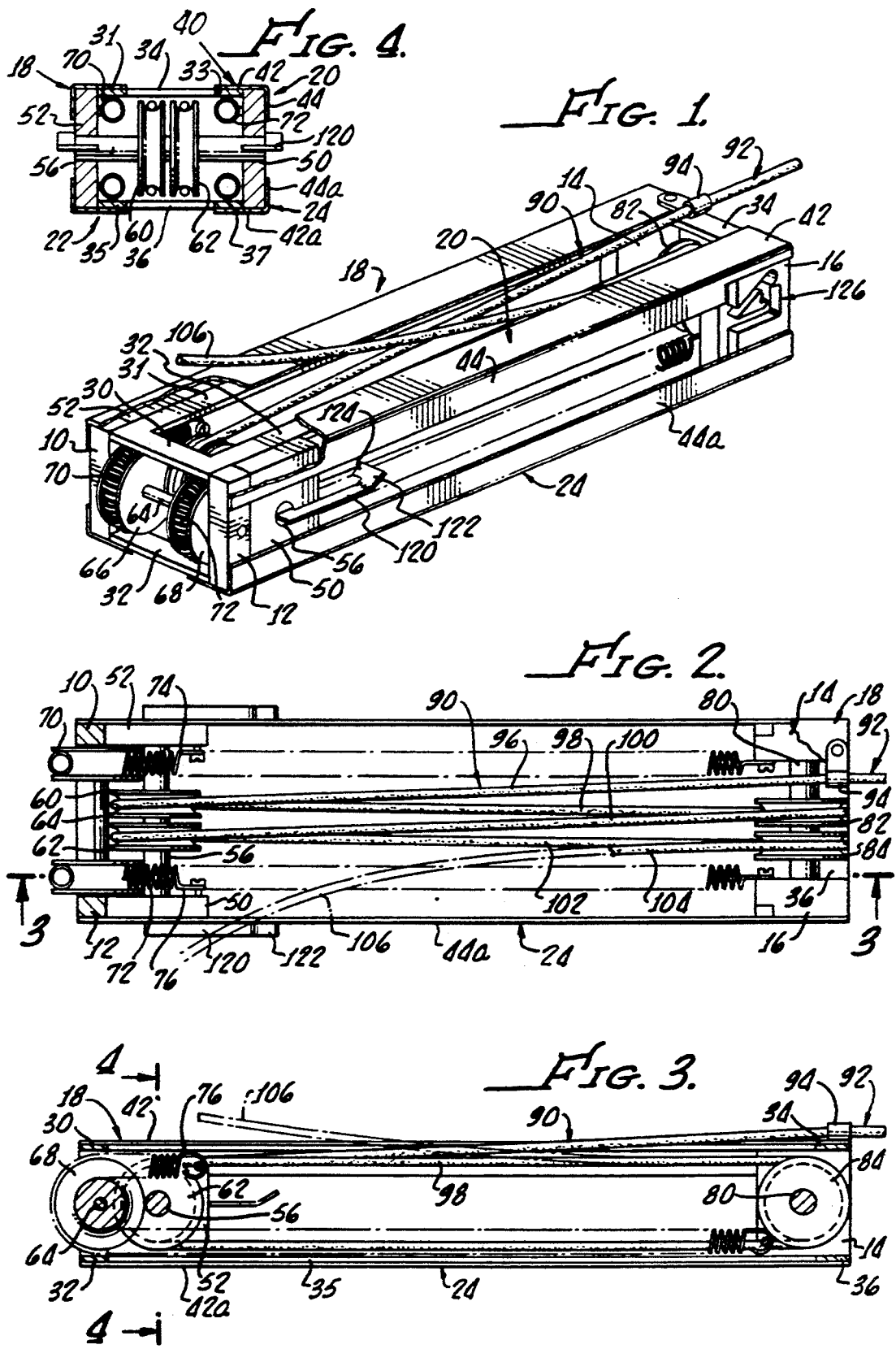

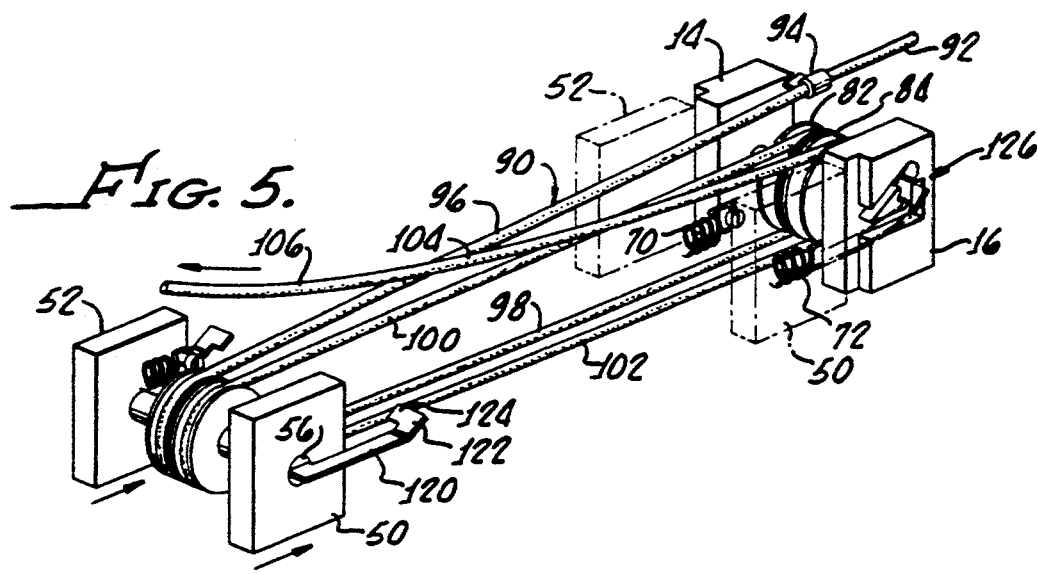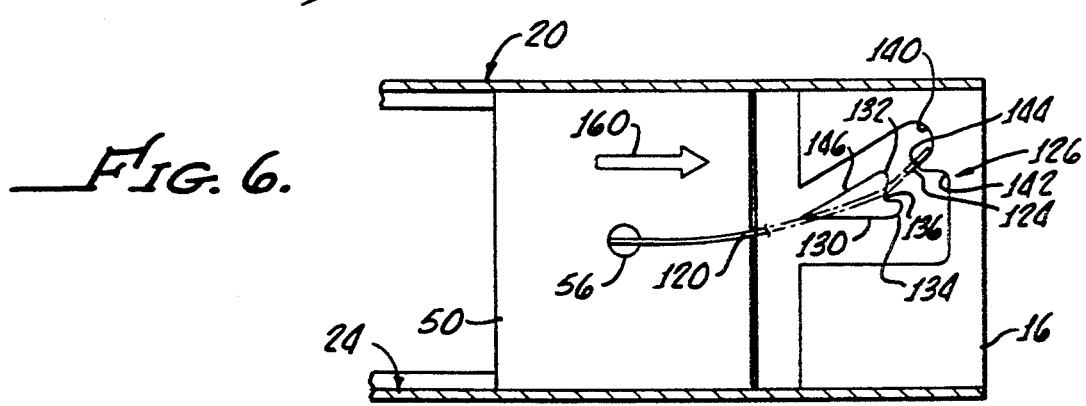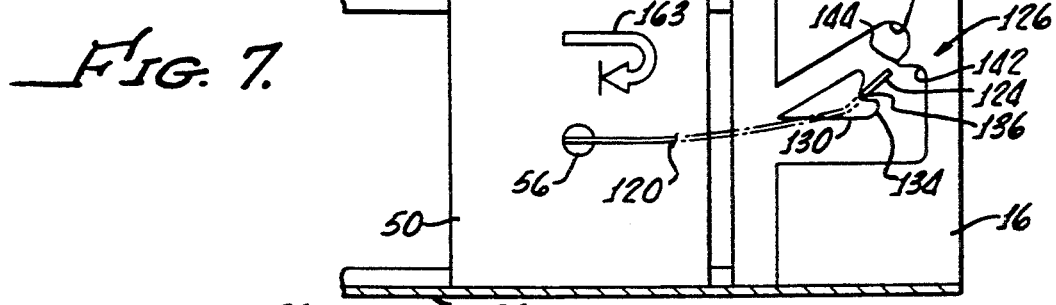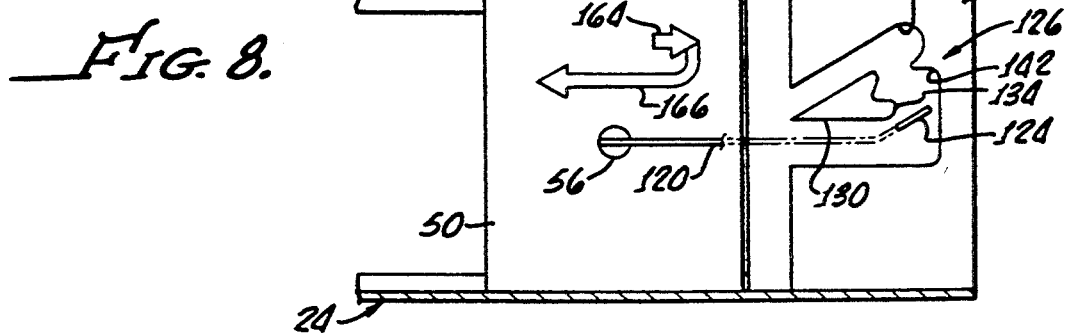

CORD RETRACTOR MECHANISM

BACKGROUND OF THE INVENTION

1. Field of the Invention

The present invention relates to cord retractor mechanisms and more particularly concerns a mechanism that can be attached to any position along the length of a cord without requiring splicing, pre-coiled wires or brush commutators.

2. Description of Related Art

Various types of electronic instrumentation are remotely controlled or are coupled with a handset or hand-held controller by an multi-wire electric cord extending to some type of electronic box. For example, a telephone handset or a hand-held microphone and control are connected by multi-wire electric cords to relatively fixedly positioned electronic devices, such as the telephone body or a recorder itself. A hand controller or handset for an aircraft passenger entertainment system may be connected by an electric cable to an electronic control box. The handset, which is preferably stored in a position closer to the electronic control box, is movable to different locations for operation and, accordingly, it is necessary that the length of electrical cable connecting the handset with the electronic control box have a variable effective length.

Many mechanisms have been devised for facilitating variation in the effective length of the cord connected to a handset. These include wires pre-formed in a coil or spiral configuration, which may provide a shorter length of interconnecting cord, but, nevertheless, still allow a length of loose wire to extend from the handset.

A common retractor mechanism actually winds the cord around a drum or axle for storage and allows lengths of cord to be withdrawn by rotation of the drum. Since the end of the cord within the storage device must be connected to a fixed cord, which itself is connected to the electronic control box, brush commutators are required to provide electrical continuity between the fixed cord section and the rotating cord section. Such brush commutators are relatively complex, difficult to manufacture, and, importantly, lack reliability. Brushes are notoriously short lived. They wear rapidly and must be replaced after a relatively short period of use. Moreover, the cord coiling mechanism can be connected at only one position along the length of the cord and must be used with a cord having a splice or connecting brushes. Some cord retractors operate through twisting of the cord, which causes repetitive stresses, resulting in premature breakage of the cord wires.

Accordingly, it is an object of the present invention to provide a cord retractor that avoids or minimizes above-mentioned problems.

SUMMARY OF THE INVENTION

In carrying out principles of the present invention in accordance with a preferred embodiment thereof, first and second pulleys are journalled at first and second ends of an elongated frame, and a storage section of cord is wound over the pulleys, with a first end of the stored cord section clamped to the frame and the second end extending freely from the frame. The first pulley is slidably mounted on the frame so that pulling on the free end of the cord will move this pulley toward the fixed pulley and extract a length of cord from the frame. In this position the movable pulley is releasably latched, with a major part of the stored cord section withdrawn. Unlatching of the retractor mechanism and retraction of the extended cord length is accomplished by a pull on the free end of the cord to release the latch and to allow an extended spring to pull the cord back into storage.

BRIEF DESCRIPTION OF THE DRAWINGS

In the accompanying drawings:

FIG. 1 is a pictorial view, with parts broken away, of a cord retractor mechanism embodying principles of the present invention;

FIG. 2 is a top view of the retractor mechanism;

FIG. 3 is a section of the retractor mechanism taken on lines 3—3 of FIG. 2;

FIG. 4 is a transverse section of the mechanism taken on lines 4—4 of FIG. 3;

FIG. 5 is a pictorial illustration of operating elements of the retractor mechanism with the mechanism frame and spring retractors omitted; and FIGS. 6 through 8 show details of the latching mechanism.

DESCRIPTION OF A PREFERRED EMBODIMENT

A rigid elongated frame comprises a pair of laterally spaced upstanding end posts 10,12 at one end and a corresponding pair of laterally spaced end blocks 14,16 at the other end. The end posts and end blocks are fixedly connected to each other at four corners of the frame by 24. End posts 10 and 12 are rigidly interconnected and laterally spaced from one another by upper and lower transversely extending space bars 30,32. Similarly, end blocks 14 and 16 are rigidly interconnected and laterally spaced from one another by upper and lower transversely extending space bars 34,36. Space bars 30 and 34 are fixedly interconnected by longitudinally extending inner guides 31,33, forming an upper integral elongated rectangular frame 30,31,33,34. Similarly, bars 32 and 36 are fixedly interconnected by longitudinally extending inner guides 35,37 forming a lower integral elongated rectangular frame 32,35,36,37. The inner guides of the upper and lower frames form parts of the track assemblies.

The four track assemblies are identical to one another, although of different orientation and opposite hand. As shown in FIG. 4, each track assembly includes an outer track section 40 formed of an elongated angle member having a right angle cross section, including a horizontal leg 42 and a vertical leg 44. Inner guide 33 of upper rectangular frame 40 is fixed to the inner side of the horizontal leg and has an inner side spaced from the vertical leg 44 to form an elongated guide recess that slidably receives one end of a rigid rectangular (square) slide block 50. The lower end of the slide block 50 (as viewed in FIG. 4) is slidably mounted in the longitudinally extended lower track 24, which itself is formed of an elongated angle member having a vertical leg 44a, a horizontal leg 42a and the inner guide 37 of the lower rectangular frame. Guide 37 is spaced from the vertical leg 44a to form a lower slide block receiving guideway. Upper and lower tracks 18 and 22 on the other side of the frame are identical, but of opposite hand, to the pair of tracks 20 and 24, and slidably mount a second rigid rectangular slide block 52. The slide blocks are made of or coated with a low friction material, such as Teflon or the like, and collectively carry a transverse pulley shaft 56 with ends mounted in the respective guide blocks 50 and 52. First and second cord pulleys 60 and 62 are journalled on the shaft, and, accordingly, are longitudinally movable along the frame together with the slide blocks and shaft.

A transverse spring shaft 64, longitudinally spaced from pulley shaft 62, is journalled in end posts 10 and 12 respectively and fixedly carries spring pulleys or spring wheels 66,68 over which are entrained a pair of elongated tension springs 70,72. A first end 74,76 of the respective springs is fixedly attached to an inner side of the respective guide blocks 50 and 52.

At the other end of the frame, end blocks 14,16 carry a second pulley shaft 80 upon which are journalled third and fourth cord pulleys 82,84.

An electric cord or cable 90 includes a fixed end 92 clamped to the frame by a clamp 94 and extending longitudinally from the cord retractor mechanism to a fixed electronic control box or device (not shown). The storage or stored section of cord 90 is wound over the four pulleys 60,62,80,84 and includes a first leg 96 extending from clamp 94 to and over pulley 60, a second leg 98 extending from pulley 60 to and over pulley 82, a third leg 100 extending from pulley 82 to pulley 62, a fourth leg 102 extending from pulley 62 to pulley 84, and a fifth leg 104 extending from pulley 84 to the free or movable end 106 of the stored cord section. Springs 70 and 72 extend longitudinally of the frame and have non-movable ends fixed to end blocks 14,16, respectively. Thus the springs, which extend over the spring pulleys 66,68 and are under tension in the configuration shown in the drawings, exert a continuous retraction force on the respective slide blocks 50,52. This force tends to urge the slide blocks away from end blocks 14,16 (toward the left as seen in FIGS. 2 and 3) to the cord storage or retracted position illustrated in FIG. 1.

Pulling on the free end 106 of the stored cord exerts a pull on the movable pulleys 60,62 and draws the slide blocks 50,52 and the cord pulleys 60,62 along the tracks away from end posts 10,12 and toward the fixed end blocks 14,16 (toward the right as seen in FIGS. 2 and 3). This motion of the slide blocks and longitudinally shiftable pulleys 60,62 is resisted by continued elongation of the springs 70 and 72, which have movable ends fixed to the slide blocks from which they extend over the spring pulleys and then back to the end blocks 14,16.

As the free end 106 of the cord is withdrawn, the slide blocks move to the dotted line positions shown in FIG. 5. This is a latched position illustrated in FIG. 5 by the dotted line showing of slide blocks 50,52 closely adjacent the end blocks 14,16. A resilient spring latch arm 120 is carried by slide block 50 and includes an upwardly extending angulated end portion 122 having a laterally inwardly directed arm 124. The outer side of end block 16 is formed with a latch recess 126, which is more particularly illustrated in FIGS. 6 through 8.

The latch recess includes a first or locking heart shaped cam member 130 having first and second lobes 132,134 with an inter-lobe recess 136. The cam member projects laterally outwardly in the latch recess. The latch recess also includes a second heart shaped unlatching cam member having a first lobe 140 and a second lobe 142, with an inwardly directed projection 144 between the two lobes. Lobes 140,142 and projection 144 are formed by the inner surfaces of the unlatching heart shaped cam member.

As the free end 106 of the cord is pulled to withdraw cord from the storage mechanism, and as the slide blocks move along the track, upwardly inclined arm section 122 and tongue 124 of latch arm 120 of the slide block 50 eventually engage the upper surface 146 of locking cam 130 and ride up over lobe 132 to contact the surface of lobe 140 of the second cam. This stops further motion of the slide block 50 toward the end block 16 and the free end of the cord is now released. This position is shown in FIG. 6. Arrow 160 indicates the direction of latching motion. Resilience of the arm 120, which has now been bent upwardly by the cam action of cam surface 146, causes this arm to move downwardly (when pull on cord end 106 is released), past lobe 132 and along the surface of lobe 140 until the latching tongue 124 of the latch arm 120 is lowered sufficiently to engage the recess 136 between lobes 132 and 134. This position is shown in FIG. 7, wherein arrow 163 indicates the motion of the latch arm. This engagement of tongue 124 in recess 136 occurs when the pull on the cord is released and the springs 70 and 72 pull the slide block 50 back a small distance toward their storage position. Thus, the tongue 124 comprises a lateral (projecting laterally inward) cam follower tongue that rides over the convex cam lobes and along the concave cam lobes. The mechanism is now securely latched in extended position (FIG. 7) with the slide blocks 50,52 closely adjacent the end blocks 14,16, the pulleys 60,62 closely adjacent the fixed pulleys 82,84, and the latch tongue 124 hooked in recess 136. The length of stored cord has been greatly decreased and most of the stored cord is now extended from the mechanism.

The cord is pulled again and released to disengage the latch. With the mechanism in the latched position of FIG. 7, a slight additional pull on the free end 106 of the stored cord tends to drive the slide block 50 and its latch arm 120 further to the right, as illustrated by arrow 164 in FIG. 8, toward the lobe 142 of the latching recess. The angulated latch arm 122 and its tongue 124, when in latched position, are below the projection 144 of the latching cam surface 140,142,144. Therefore, driving this latch arm toward the right causes the cam surface 142 to cam the latch arm tongue downwardly to a position below the lower lobe 134 of the locking cam 130. Accordingly, a slight pull on the cord 106 (in latched, cord extended position) allows the tensioned springs to pull the slide blocks and the latch arm 120 back toward the storage position (as indicated by arrow 166 in FIG. 8), with the latch arm now moving toward the left, below the latching cam 130 and past its lower lobe 134.

If deemed necessary or desirable, the slide block 52 and the end block 14 are also arranged to provide releasable latching operation that is precisely the same as but of opposite hand relative to the latching mechanism described for slide block 50 and end block 16.

With a cord retractor mechanism having an overall length of approximately 5 inches and employing two pairs of pulleys to provide five legs of stored cord, the mechanism will store and allow withdrawal of approximately 21 inches of cord. Of course the number of pulleys in each set, that is, at each end of the mechanism, may be varied to change the total length of stored cord. Thus, each end of the mechanism may have but a single pulley or may have three or more pulleys if it is desired to increase the amount of cord storage.

What is claimed is:
1. A cord retractor comprising:
an elongated frame having first and second frame ends, first and second laterally spaced tracks extending between and fixed to said frame ends, first pulley means journalled to said frame at said first frame end, first and second movable supports respectively mounted in said first and second tracks for motion between said first and second frame ends, second pulley means journalled to and positioned between said movable supports, a cord having an intermediate storage section, one end of said storage section being fixed to one of said first and second frame ends and the other end of said storage section comprising a free end extending from said frame, said cord storage section being wound over said first and second pulley means, and means for urging said movable supports and said second pulley means toward said second frame end.

2. The cord retractor of claim 1 including latch means for releasably securing said supports in a latched position adjacent said first frame end, whereby a tensile force applied to said cord free end will draw said supports and second pulley means toward said latched position in which said supports and said second pulley means may be latched to and at said first frame end with at least portions of said cord storage section withdrawn from said retractor, and whereby upon release of said latch means said supports and said second pulley means are drawn toward said second frame end, thereby retracting said cord storage section into said cord retractor.

3. The cord retractor of claim 2 wherein said first frame end includes a first end block fixed to one of said tracks at said first frame end, and wherein said latch means comprises a resilient latch arm carried by said first slide block, and first and second longitudinally spaced heart shaped cam means carried by said first end block and configured and arranged to releasably latch said resilient latch arm.

4. The cord retractor of claim 3 wherein said first cam means comprises a heart shaped cam having first and second outwardly convex lobes and a concave recess between said lobes, said second cam means comprising a heart shaped cam surface having first and second concave lobes and a projection positioned between said concave lobes, said projection extending toward said concave recess of said first cam means, said resilient latch arm including a lateral cam follower tongue configured and arranged to ride over said convex cam lobes and to ride along said concave cam lobes of said second cam.

5. The cord retractor of claim 1 wherein said supports each comprise a low friction slide block slidably mounted in said tracks, and wherein said second pulley means comprises a shaft carried by said slide blocks and a pair of pulleys mounted on said shaft.

6. The cord retractor of claim 5 wherein said means for urging said movable support and said second pulley means comprise first and second spring wheels journalled to said frame at said second frame end, and first and second tension springs entrained over said spring wheels, each of said tension springs having a first end secured to one of said slide blocks and an opposite end secured to said first frame end.

7. A cord retractor comprising:

an elongated frame having first and second frame ends, a first cord pulley journalled to said frame at said first frame end, a second cord pulley journalled to said frame at said second frame end, a cord wound over said pulleys, said cord having a first cord end extending from said frame at said first frame end and a second cord end extending from said frame at said second frame end, means for slidably mounting said second cord pulley to said frame for motion toward and away from said first frame end and toward and away from said first cord pulley, means for urging said second cord pulley toward said second frame end wherein said means for urging said second cord pulley toward said second frame end comprises a spring pulley journalled to said frame at said second frame end, and an elongated tension spring entrained over said spring pulley, said spring having a first end secured to said second cord pulley and a second end secured to said frame at said first frame end, means for securing one of said cord ends to said frame, and latch means for releasably securing said second cord pulley in a latched position adjacent said first frame end and adjacent said first cord pulley, whereby pulling the other of said cord ends will move said second cord pulley to said latched position and withdraw a length of cord from said frame.

* * * * *